United States Patent [19]

Sears et al.

[11] Patent Number: 4,978,429

[45] Date of Patent: Dec. 18, 1990

[54] APPARATUS INCLUDING ITS OWN COMBINATION MANIFOLD/SUPPORT ASSEMBLY FOR PRODUCING A CONCENTRATE AND A DISTILLATE

[76] Inventors: Stephan B. Sears, 925 Peninsula Way; Dan M. Pomeroy, 4400 Fair Oaks Ave., both of Menlo Park, Calif. 94025; Richard O. Rhodes, 490 Belvedere St., San Francisco, Calif. 94117

[21] Appl. No.: 298,656

[22] Filed: Jan. 18, 1989

[51] Int. Cl.[5] .......................... B01D 1/26; B01D 1/28
[52] U.S. Cl. .................................. 202/172; 202/174; 202/182; 202/197; 202/266; 159/17.1; 159/24.1; 159/28.6; 203/10; 203/26
[58] Field of Search ..................... 203/26, 24, 40, 11, 203/10, DIG. 17, DIG. 22, 71; 202/266, 267.1, 197, 182, 180, 172, 173, 174; 159/28.6, DIG. 27, DIG. 28, 24.1, 24.2, 17.1; 165/167

[56] References Cited

U.S. PATENT DOCUMENTS

| | | | |
|---|---|---|---|
| 3,073,380 | 1/1963 | Palmason | 165/167 |
| 3,150,028 | 9/1964 | Wennerberg | 159/28.6 |
| 3,414,483 | 12/1968 | Henderson | 203/26 |
| 3,469,615 | 9/1969 | Usher | 159/28.6 |
| 3,650,905 | 3/1972 | Rodgers | 202/172 |
| 3,735,793 | 5/1973 | Burberry et al. | 165/167 |
| 3,768,539 | 10/1973 | Chamberlin et al. | 159/28.6 |
| 4,503,908 | 3/1985 | Rosman et al. | 165/167 |
| 4,504,361 | 3/1985 | Tkac et al. | 202/172 |
| 4,636,283 | 1/1987 | Nasser | 202/266 |
| 4,671,856 | 6/1987 | Sears | 203/26 |
| 4,673,459 | 6/1987 | Elmore et al. | 159/28.6 |

*Primary Examiner*—Wilbur Bascomb
*Attorney, Agent, or Firm*—Flehr, Hohbach, Test, Albritton & Herbert

[57] ABSTRACT

An apparatus especially suitable for distilling water is disclosed. This apparatus, as disclosed, includes first and second separate and distinct groups of adjacent, confronting plate members, each of which alternatively defines a series of boiling and condensing chambers and a compressor. The apparatus also includes a device for fluid connecting the various boiling and condensing chambers and compressor to one another so that feed water can first be converted to steam in the boiling chambers, then compressed in the compressor, and finally condensed into pure water in the condensing chambers. The two groups of plate members are connected to and supported by a combination manifold/support assembly which serves both as part of the fluid connecting device and as a device for supporting the confronting plate members.

16 Claims, 3 Drawing Sheets

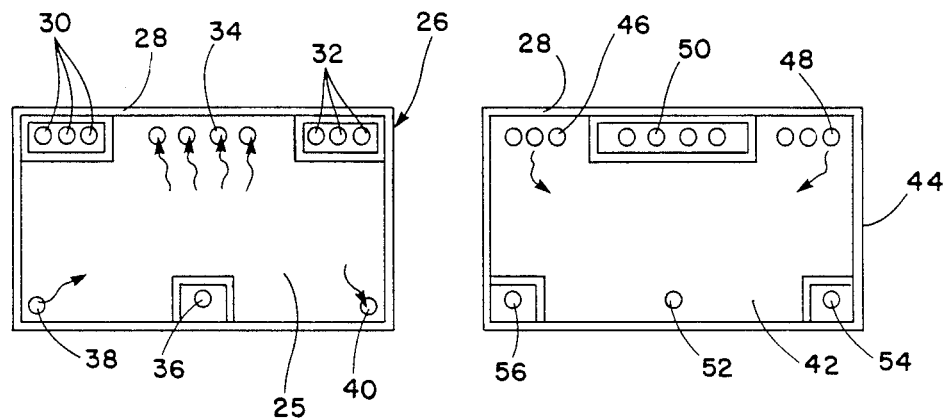
FIG.-3.
FIG.-4.
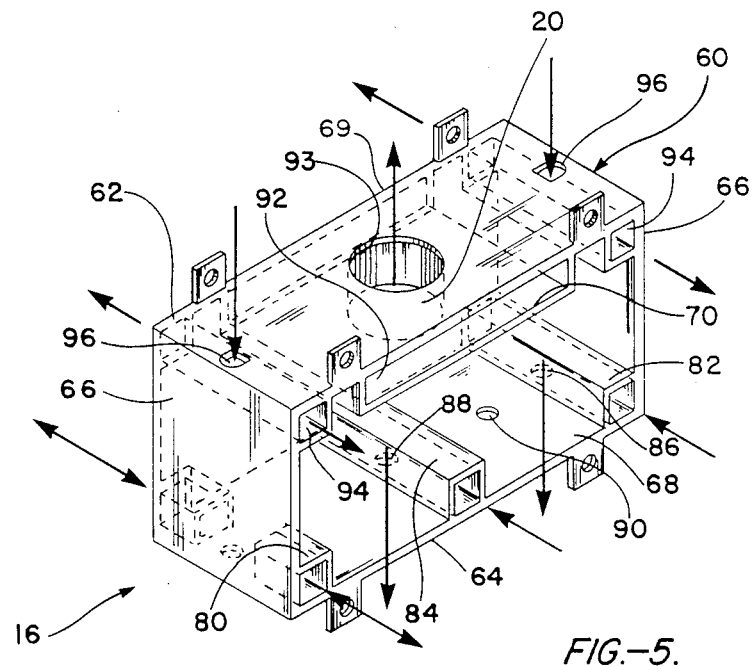
FIG.-5.

APPARATUS INCLUDING ITS OWN COMBINATION MANIFOLD/SUPPORT ASSEMBLY FOR PRODUCING A CONCENTRATE AND A DISTILLATE

The present invention relates generally to an apparatus for producing a concentrate and a distillate from a given feed material which is at least in part liquid, and more particularly to a combination manifold/support assembly for use as part of an overall distillation apparatus for producing pure water from feed water.

One example of the particular distillation apparatus contemplated by the present invention is described in Stephan B. Sears U.S. Pat. No. 4,671,856 which is incorporated herein by reference. Referring specifically to FIGS. 1-4 in the Sears patent, the distillation apparatus disclosed there includes a series of adjacent, confronting plate members which together alternatively define a series of boiling and condensing chambers, a compressor and means for fluid connecting the chambers and compressor to one another so that feed water can first be converted to steam in the boiling chambers, then compressed in the compressor, and finally condensed into pure water in the condensing chambers. While this process is generally satisfactory for its intended purpose, as will be discussed hereinafter, the present invention provides for an improved combination manifold/support assembly serving as a part of the fluid connecting means and as a means for supporting the plate members.

It is thus an object of the present invention to provide an improved distillation apparatus including its own combination manifold/support assembly. As will be described in more detail hereinafter, this support assembly includes a structural shell, means connecting the plate members to the shell, and structural reinforcing means located within and connected to internal surfaces of the shell for reinforcing the latter. These structural reinforcing means and adjacent internal surfaces of the shell together define a number of internal manifolds which form part of fluid connecting means between the boiling and condensing chambers and the compressor so that feed water can first be converted to steam in the boiling chambers, then compressed in the compressor, and finally condensed into pure water in the condensing chambers.

In a preferred embodiment of the present invention, the overall distillation apparatus disclosed herein includes two separate and distinct plurality of adjacent, confronting plate members which are connected to the structural shell forming part of the overall manifold/support assembly.

The overall distillation apparatus disclosed herein will be described in more detail in conjunction with the drawings wherein:

FIG. 3 is a front elevational view of the boiling side of a boiling plate member forming part of the apparatus of FIG. 1;

FIG. 4 is a front elevational view of the condensing side of a condensing plate member forming part of the apparatus of FIG. 1.

FIG. 5 is a perspective view of part of a combination manifold/support assembly forming part of the apparatus of FIG. 1;

Figure 1:
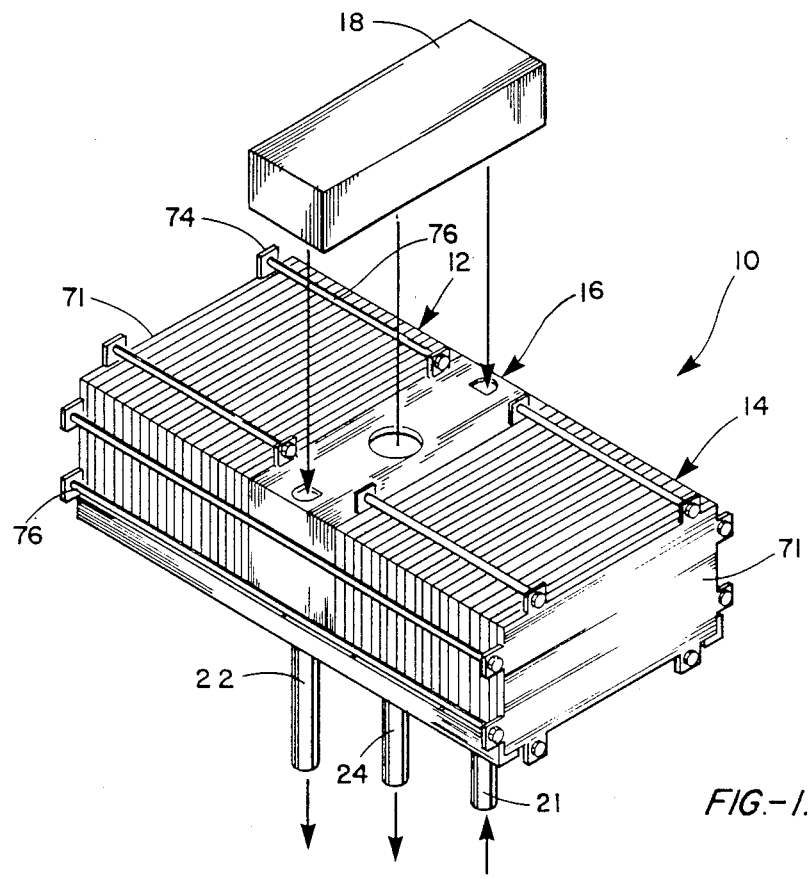
FIG. 1 is a partially exploded perspective view of the distillation apparatus including a combination manifold/support assembly designed in accordance with a present invention.
Figure 2:
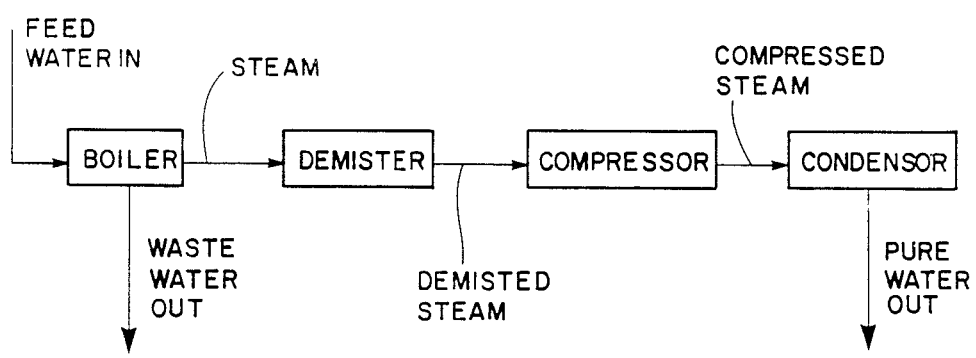
FIG. 2 is a flow diagram describing the process carried out by the distillation apparatus of FIG. 1.

Turning now to the drawings, wherein like components are designated by like reference numerals throughout the various figures, attention is first directed to FIGS. 1 and 2. FIG. 1 illustrates a distillation apparatus which is designed in accordance with the present invention. Distillation apparatus 10 includes first and second separate and distinct groups of adjacent, confronting plate members which together alternatively define a series of boiling and condensing chambers which are similar to those described in the above-recited Sears United States patent and which will be described in more detail hereinafter. These separate and distinct groups of plate members, generally designated by the reference numerals 12 and 14, respectively, are connected to and supported by opposite sides of a combination manifold/support assembly generally indicated by the reference numeral 16. The overall apparatus also includes a compressor 18 and a demister cyclone 20 (see FIG. 5) as well as other components (not shown) including, but not necessarily limited to, control sensors and degassers.

As will also be described in more detail hereinafter, the two groups of plates 12 and 14 and the combination manifold/support assembly 16 together define a series of fluid connecting passageways and manifolds so that feed water can first be converted to steam in the boiling chambers, then compressed in the compressor, after passing through the demister, and finally condensed into pure water in the condensing chambers. This is best illustrated in the flow diagram depicted in FIG. 2. The feed water first enters the apparatus from an inlet hose 21 (see FIGS. 1 and 5) which is connected to an inlet into assembly 16, as will be seen hereinafter in conjunction with FIGS. 5 and 6. The feed water partially fills assembly 16 and passes from assembly 16 through cooperating manifolds into the various boiling chambers defined between plate members 12 and 14. As the water is boiled, the waste water is directed out of the apparatus through cooperating passageways and manifolds in the plate members and combination manifold/support assembly. An exit hose 22 provided for this purpose is connected to a waste water manifold in assembly 16, as will also be seen in conjunction with FIGS. 5 and 6. At the same time, steam from the boiler presses through a cooperating manifold to the demister 20. The demisted steam is then directed to compressor 18, again through a cooperating manifold in assembly 16. Finally, the compressed steam is directed through a cooperating manifold into the condensing chamber where the steam is then condensed into pure water. The pure water exits the apparatus, again through a cooperating manifold in assembly 16. Tube 24 is connected to this latter manifold provided for that purpose.

It is to be understood that the process as described generally above is not new per se and does not form part of the present invention. Hence, the process will not be further described herein. For a more detailed explanation of the process and the way in which the various boiling and condensing chambers function, reference is made to the previously cited Sears patent. On the other hand, the present invention is directed to the specific way in which the combination manifold/support assembly 16 functions to support the two groups of plate members 12 and 14 and the way in which it fluid connects the boiling and condensing chambers, the demister and the compressor to one another in order to carry out the above described process.

Having described the overall apparatus 10 and its method of operation generally, attention is now directed to the specific manifold system defined by the various plate members 12 and 14 and combination manifold/support assembly 16. To this end, attention is first directed to FIG. 3 which illustrates the boiling surface 25 of a boiling plate member 26. The entire outer periphery of boiling surface 25 includes a circumferential sealing gasket 28 in order to seal the boiling chamber from the ambient surroundings. Plate member 26 also includes passageways 30, 32, 34, 36, 38 and 40. The passageway 38 accommodates the entry of feed water into the boiling chamber while passageway 40 serves to accommodate the passage of waste water out of the boiling chamber. At the same time, passageways 34 allow steam produced within the boiling chamber to pass therefrom. Passageways 30, 32 and 36 are sealed from the boiling chamber by cooperating sealing gaskets 28. They function as part of the condensing chamber which will be described immediately below in conjunction with FIG. 4.

Referring to FIG. 4, the condensing surface 42 of a condensing plate 44 is shown. Like the boiling plate, its outer periphery is sealed by a sealing gasket 28. Plate member 44 includes passageways 46, 48, 50, 52, 54 and 56. Passageways 46 and 48 accommodate the entry of steam into the condensing chamber. Passageway 52 accommodates the passage of pure water out of the condensing chamber. The passageways 50, 54 and 56 are sealed from the condensing chambers by sealing gaskets. These latter passageways form part of passageways 36, 40 and 38, respectively. By the same token, passageways 46, 48 and 52 form part of passageways 30, 32 and 36 in plate member 26.

Having described plate members 26 and 44, it is to be understood that they are merely examples of alternating plate members in each of the plate member groups 12 and 14. The boiling surface 25 of a given plate member 26 engages against the backside of a plate member 44 so as to define a boiling therebetween. By the same token, the condensing surface 42 of a condensing plate 44 engages against the backside of a boiling plate member 26 to define a condensing chamber therebetween. The various passageways between each plate member 26 is in registry with the associated passageways in the adjacent plate member 44. Thus, feed water can enter each and every boiling chamber through registered passageways 38 while passing through associated passageways 56 without entering the condensing chambers. In a similar manner, waste water can pass through the system, as well as steam and pure water. A more detailed discussion of the various paths taken by the fluids will be provided hereinafter.

Referring now to FIG. 5, attention is directed to the structural details of combination manifold/support assembly 16. As seen there, this assembly includes a structural shell 60, preferably constructed of stainless steel or other such structurally sound metal. The shell is rectangular in configuration so as to define a top wall 62, a bottom wall 64 and opposite side walls 66. At the same time, it is opened at opposite ends 68 and 69. This open-ended-rectangular shell serves as means for supporting both groups 12 and 14 of adjacent, confronting plate members across its opened ends. In order to accomplish this, overall combination manifold/support assembly 16 includes end plates 71 which are separate and distinct from the arrangement of boiling and condensing plates, and aligned apertured flanges or lugs 74 projecting out from the end plates and also projecting out from the ends of shell 60, as shown in FIG. 1. The plate member arrangements 12 and 14 are positioned across the opened ends 68 and 69 of shell 66 and the end plates 71 are positioned across opposite ends of these arrangements. This places the top and bottom lugs on the end plates in alignment with the top and bottom lugs on the shell while the side lugs on one end plate are aligned with corresponding side lugs on the other end plate. With the lugs in these positions, bolts 76 are provided through aligned lugs in the manner illustrated in FIG. 1 in order to support the plate members tightly between the shell and end plates. This tight fit in combination with the various sealing gaskets on the plates serves to seal the interior of shell 60 and the boiling and condensing chambers.

Returning to FIG. 5, the combination manifold/support assembly 16 includes a series of L-shaped and C-shaped reinforcing flanges, preferably constructed of stainless steel or other such structurally sound metal, located within shell 60 and welded or otherwise connected to confronting internal surfaces of the shell for reinforcing the latter. At the same time, the reinforcing flanges and internal surfaces together define a number of internal manifolds. Two such manifolds, indicated at 80, accommodate the passage of feed water into and through passageways 38 and 56 so as to fill the boiling chambers. The manifold 82 accommodates the passage of waste water out of the assembly from passageways 40 and 54. Manifold 84 accommodates the passage of pure water out of the assembly from passageways 36 and 52. Regarding manifolds 82 and 84, each include an opening 86, 88 on its bottom end for connection with previously described tubes 22, 24. An opening 90 in the bottom side of shell 60 is provided as an entry opening to previously described tube 20 in order to fill the shell partially with feed water.

Still referring to the manifolds within shell 66, a first upper manifold 92 is provided for accommodating passage of steam from openings 34 and 50 into previously recited demister 20 which is located within the manifold. The top side of shell 60 includes an opening 93 for accommodating the passage of the demisted steam into compressor 18. Manifolds 94 are positioned adjacent to manifold 92 and accommodate the passage of steam from the compressor through cooperating openings 96 in the topside of the shell. Steam passes from manifolds 94 into openings 28, 32 and 48.

Figure 6:
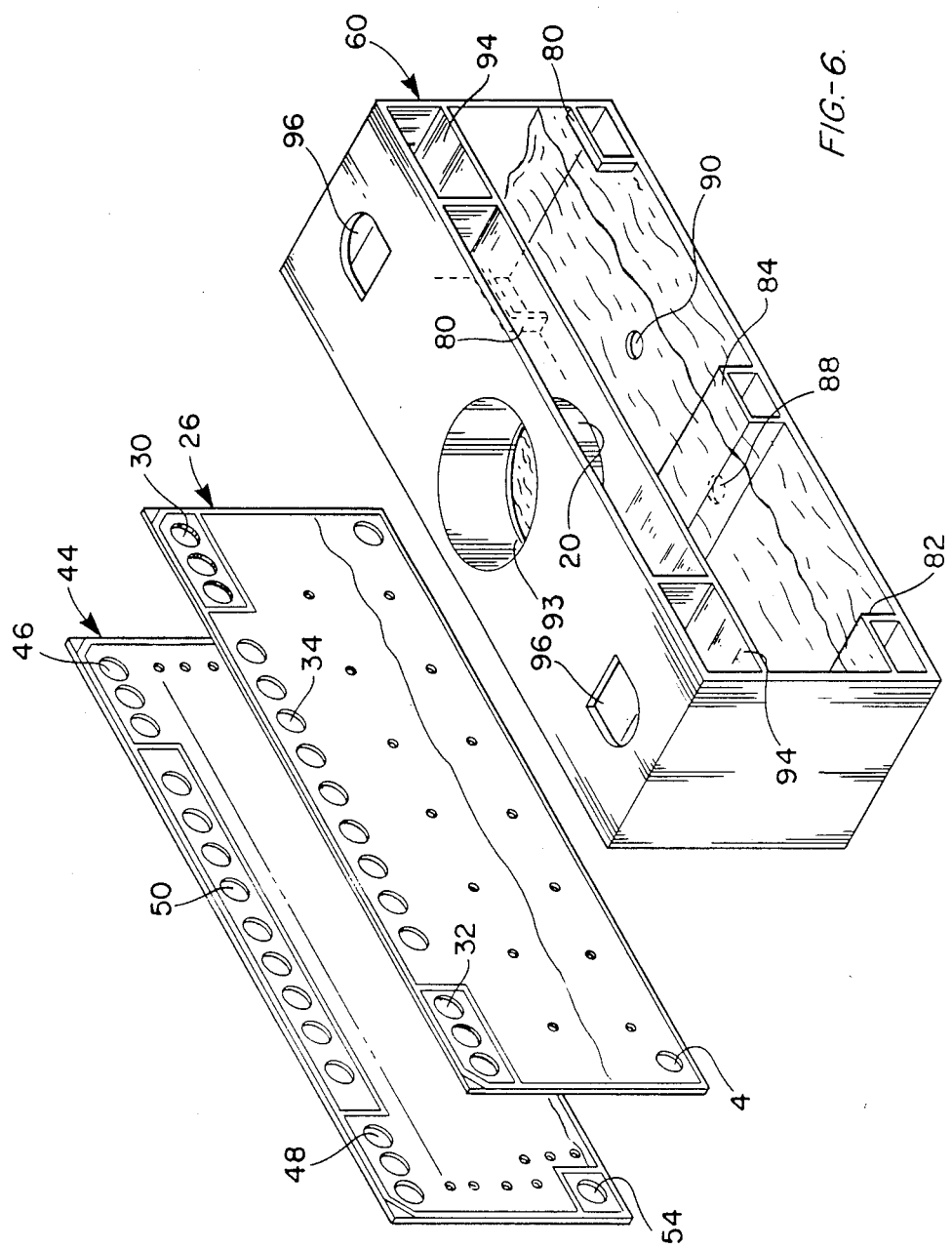
FIG. 6 is an exploded perspective view illustrating the way in which the combination manifold/support assembly of FIG. 5 interacts with the boiling plate of FIG. 3 and the condensing plate of FIG. 4.

Having described the various manifolds within shell 60, it should be apparent that when the plate member arrangements 12 and 14 are tightly held in place across the open ends of the shell, the following manifolds register with cooperating passageways in the plate members. First, manifold 80 registers with passageways 38 and 56; manifold 82 registers with passageways 40 and 54; manifold 84 registers with passageways 36 and 52; manifold 94 registers with passageways 30, 32, 46 and 48; and manifold 70 registers with passageways 34 and 50. FIG. 6 in conjunction with FIGS. 3–5 illustrates the flow of fluid between the various manifold openings in shell 60 and the various passageways within plate members 26 and 44. Note particularly that feed water enters passageway 90 in the shell and fills the shell to a certain level. The feed water passes from the shell through manifolds 80 and ultimately into various boiling chambers through openings 38 in plate members 26. The feed water is sealed from the condensing chambers by means of the sealing gaskets around the passageways 56. As the water within the boiling chambers are boiled, the waste water passes out of the boiling chambers through passageways 40, manifold 82, and ultimately out of opening 86. The steam produced in the boiling chamber passes out of these chambers through openings 34 and into manifold 70 where they drive the cyclone demister 20. The demisted steam passes up through opening 93 into compressor 18 (see FIG. 1). The steam from the compressor passes down through openings 96 into manifolds 94 and ultimately into the condensing chambers through openings 46 and 48. Pure water is produced in the condensing chamber and passes out of the latter through openings 52 and ultimately through manifold 84 and exit opening 88.

Overall apparatus 10 has been described as a distillation apparatus for converting feed water to pure water. It is to be understood that apparatus producing a concentrate and a distillate from a given feed material is also contemplated for use with the present invention. For example, given feed material which is at least in part liquid, for example milk, would be concentrated by means of an apparatus corresponding to apparatus 10. In either case, the combination manifold/support assembly serves as both a structural support and as a central manifold system. The flanges defining the manifolds within and with the shell serve to strengthen the shell. Thus, the shell does not have to be very thick or strong by itself, and separate pipe and ducts are not needed.

I claim:

1. In a distillation apparatus including a plurality of adjacent, confronting plate members which together alternatively define a series of boiling and condensing chambers, a compressor, and means for fluid connecting said chambers and said compressor to one another so that feed water can first be converted to steam in said boiling chambers, then compressed in said compressor, and finally condensed into pure water in said condensing chambers, the improvement comprising a combination manifold/support assembly serving as a part of said fluid connecting means and as a means for supporting said confronting plate members, said assembly including
   (a) a structural shell,
   (b) means connecting said plate members directly to said shell such that the latter is substantially the sole support of said plate members, and
   (c) structural reinforcing means located within and connected to internal surfaces of said shell for reinforcing the latter, said structural reinforcing means and adjacent internal surfaces of said shell together defining a number of internal manifolds forming part of said fluid connecting means.

2. The improvement according to claim 1 wherein said distillation apparatus includes a second plurality of adjacent, confronting plate members separated and distinct from but functionally identical to said first-mentioned plate members and cooperating with said compressor and said fluid connecting means in the same way as said first-mentioned plate members, and wherein said combination manifold/support assembly includes means connecting said second plurality of plate members to said shell.

3. The improvement according to claim 2 wherein said shell is rectangular in configuration and includes opposite opened ends and wherein said first-mentioned and second plate members are connected to said shell over said opposite opened ends, respectively.

4. The improvement according to claim 3 wherein said internal manifolds within said shell include separate manifolds for feed water, steam, waste water, and pure water.

5. The improvement according to claim 4 wherein said structural reinforcing means consists of L-shaped and/or U-shaped struts welded to internal surface of said shell so as to define said internal manifolds.

6. The improvement according to claim 5 including a demister mounted within said shell and wherein said fluid connecting means includes means for fluid connecting said demister between said boiling chambers and said compressor whereby steam passing from said boiling chamber to said compressor must first pass through said demister.

7. The improvement according to claim 1 wherein said shell is rectangular in configuration and includes opposite ends at least one of which is open, and wherein said plate members are connected to said shell over said opened end.

8. The improvement according to claim 1 wherein said internal manifolds within said shell includes separate manifolds for feed water, steam, waste water, and pure water.

9. The improvement according to claim 1 wherein said structural reinforcing means consist of L-shaped and/or U-shaped struts welded to internal surfaces of said shell so as to define said internal manifolds.

10. The improvement according to claim 1 including a demister mounted within said shell and wherein said fluid connecting means includes means for fluid connecting said demister between said boiling chambers and said compressor whereby steam passing from said boiling chamber to said compressor must first pass through said demister.

11. In an apparatus for producing a concentrate and a distillate from a given feed material which is at least in part liquid,
    said apparatus including a plurality of adjacent, confront plate members which together alternatively define a series of boiling and condensing chambers;
    a compressor, and means for fluid connecting said chambers and said compressor to one another so that at least some of the liquid making up said feed material can be converted to vapor in said boiling chambers, then compressed in said compressor and finally condensed in said condensing chambers, the improvement comprising a combination manifold/support assembly serving as a part of said fluid connecting means and as a means for supporting said confronting plate members, said assembly including:
    (a) a structural shell
    (b) means connecting said plate members directly to said shell such that the latter is substantially the sole support of said plate members, and
    (c) structural reinforcing means located within and connected to internal surfaces of said shell for reinforcing the latter, said structural reinforcing means and adjacent internal surfaces of said shell together defining a number of internal manifolds forming part of said fluid connecting means.

12. The improvement according to claim 11 wherein said apparatus includes a second plurality of adjacent, confronting plate members separated and distinct from but functionally identical to said first-mentioned plate members and cooperating with said compressor and said fluid connecting means in the same way as said first-mentioned plate members, and wherein said combination manifold/support assembly includes means connecting said second plurality of plate members to said shell.

13. The improvement according to claim 12 wherein said shell is rectangular in configuration and includes opposite opened ends and wherein said first-mentioned and second plate members are connected to said shell over said opposite opened ends, respectively.

14. The improvement according to claim 13 wherein said structural reinforcing means consist of L-shaped and/or U-shaped struts welded to internal surfaces of said shell so as to define said internal manifolds.

15. An apparatus for producing a concentrate and a distillate from a given feed material which is at least in part liquid, said apparatus comprising:
   (a) a first plurality of adjacent, confronting plate members which together alternatively define a series of boiling and condensing chambers;
   (b) a second plurality of adjacent confronting plate members which together alternatively define a second series of boiling and condensing chambers;
   (c) a compressor;
   (d) means for fluid connecting said chamber and said compressor to one another so that at least some of the liquid making up said feed material can be converted to vapor in said boiling chambers, then compressed in said compressor and finally condensed in said condensing chambers, said fluid connecting means including the combination manifold/support assembly serving as part of the fluid connecting means and as a means for supporting said confronting plate members, said assembly including:
      (i) a structural shell,
      (ii) means connecting said first and second plurality of plate members directly to said shell such that the latter is substantially the sole support of said plate members, and
      (iii) structural reinforcing means located within and connected to internal surfaces of said shell for reinforcing the latter, said structural reinforcing means and adjacent internal surfaces of said shell together defining a number of internal manifolds forming part of said fluid connecting means.

16. An apparatus according to claim 15 wherein said feed material is feed water, said distillate is pure water and said concentrate is waste water.

* * * * *